Figures 1, 2:
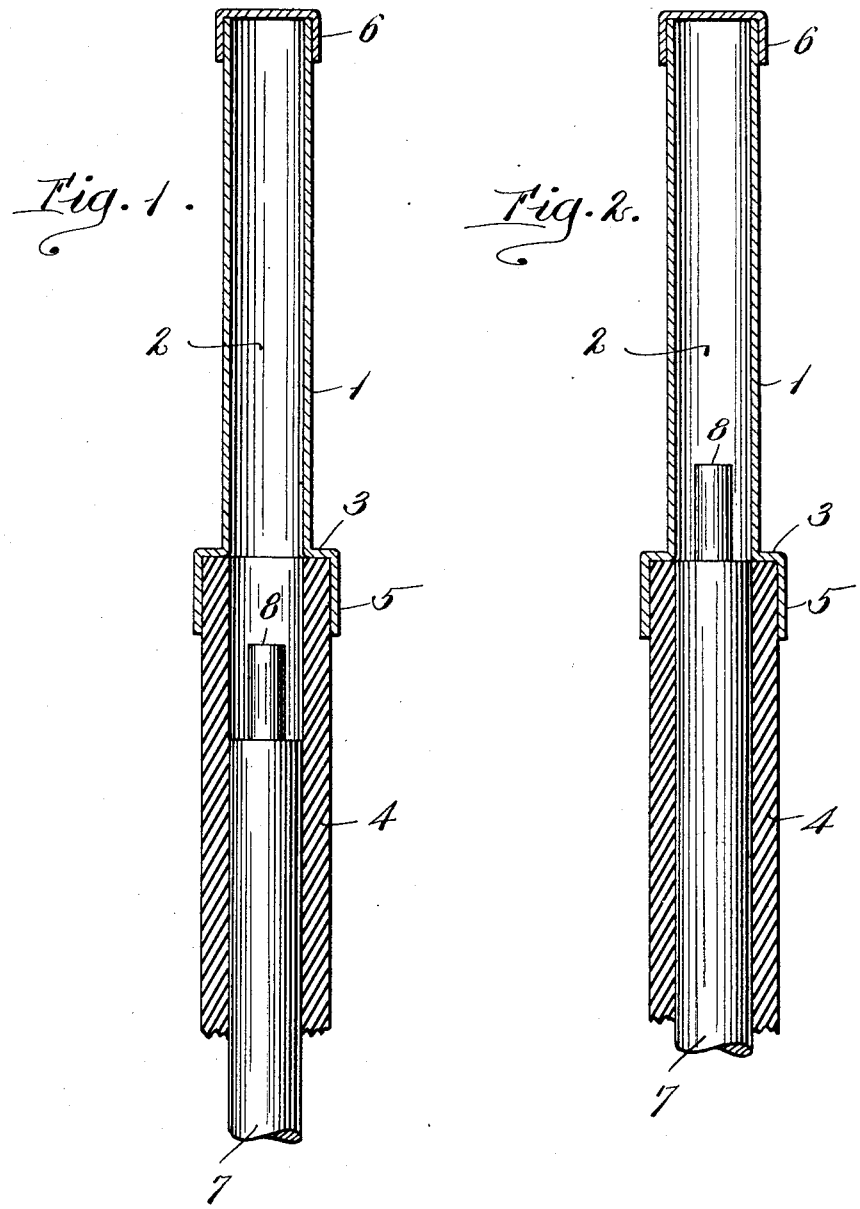

Oct. 14, 1930.   J. W. PHELPS   1,778,399
TOOL
Filed Oct. 31, 1929

Inventor:
James W. Phelps
by George Rockwell
atty.

Patented Oct. 14, 1930

1,778,399

UNITED STATES PATENT OFFICE

JAMES W. PHELPS, OF MELROSE, MASSACHUSETTS, ASSIGNOR TO STOWE & WOODWARD COMPANY, OF NEWTON UPPER FALLS, MASSACHUSETTS, A CORPORATION OF MASSACHUSETTS

TOOL

Application filed October 31, 1929. Serial No. 403,678.

The principal object of my invention is to provide a tool for use in applying an expansible sleeve or tube to another member, the latter fitting closely within the sleeve or tube, my invention having especial application in typesetting machines in which cams act upon cam rollers, the cam roller consisting of a cylindrical shaft having extensions to form bearings, the shaft portion being surrounded by a close-fitting rubber tube or sleeve.

A feature of my invention is a hand tool for applying such a sleeve to such a shaft by trapping and compressing air.

Another feature is forming and locating the compression chamber so that one of the shaft extensions above referred to may enter within said chamber so as to permit complete application of the sleeve to the shaft.

Another feature is a formation of the tool with a centering portion which preferably acts also to add to the trapping and compression of the air.

In the drawing

Figure 1 is a sectional elevation of a tool embodying my invention and showing the sleeve in one position; and Figure 2 is a similar elevation but showing the sleeve in a different position.

My tool has a cylindrical body portion 1 within which is a chamber 2 for compressing air. The body 1 is provided with an annular shoulder portion 3 to engage the top of the rubber sleeve 4 and with an annular flange 5 to encircle and closely fit the upper outside portion of the sleeve so as to aid in trapping air in said chamber 2, said flange acting also to center the tool with relation to the rubber sleeve. The body 1 has a cap 6 which may be soldered in place so as to close said chamber except for the opening therefrom which leads to the interior of the sleeve.

I have illustrated my tool as applying a rubber sleeve or tube to a shaft 7 having an extension 8 to serve as one bearing for the shaft, the latter being for use in typesetting machines and when covered by the rubber tube acting as a keyboard member.

In using my tool the rubber sleeve or tube is first brought into position a slight distance over the end of the shaft and then the tool is placed over the end of the sleeve and when pressure is brought to bear by shoulder 3 on the end of the roll the air is trapped and through compression thereof the rubber sleeve is expanded allowing the sleeve to slip along the shaft without distortion or twisting. In Figure 2 the sleeve is shown as pushed fully down in place on the shaft, this being permitted by locating the chamber 2 so that the bearing extension 8 may enter chamber 2.

What I claim is:

1. A tool for applying an expansible sleeve to a support and comprising a member provided with a chamber closed except for an opening to lead to the interior of said sleeve and having a portion adapted to engage the sleeve to force the latter along said support.

2. A tool for applying an expansible sleeve to a support, the latter having a bearing extension, said tool comprising a member provided with a chamber closed except for an opening to lead to the interior of said sleeve, said chamber being of sufficient length to receive substantially all of said bearing extension and comprising a portion adapted to engage the sleeve to force the latter along said support.

3. A tool for applying an expansible sleeve to a support and comprising a member provided with a chamber closed except for an opening to lead to the interior of said sleeve and having a portion adapted to engage the sleeve to force the latter along said support, and having a part to surround and closely fit a portion of the sleeve.

4. A tool for applying an expansible sleeve to a support, the latter having a bearing extension, said tool comprising a member provided with a chamber closed except for an opening to lead to the interior of said sleeve, said chamber being of sufficient length to receive substantially all of said bearing extension and comprising a portion adapted to engage the sleeve to force the latter along said support, and comprising a part to surround and closely fit a portion of the sleeve.

JAMES W. PHELPS.